United States Patent [19]

Brandoli et al.

[11] Patent Number: 5,524,504
[45] Date of Patent: Jun. 11, 1996

[54] DEVICE FOR LONGITUDINALLY ADJUSTING MOTOR VEHICLE SEATS

[75] Inventors: Luigi Brandoli, Rivoli; Damiano Siviero, Collegno; Dorino Cariola, Val della Torre; Claudio Rondonotti, Cinisello Balsamo, all of Italy

[73] Assignee: Elcat S.p.A., Turin, Italy

[21] Appl. No.: 415,755

[22] Filed: Apr. 3, 1995

Related U.S. Application Data

[63] Continuation of Ser. No. 977,525, Nov. 17, 1992, abandoned.

[30] Foreign Application Priority Data

Nov. 21, 1991 [IT] Italy ................ TO91A0893

[51] Int. Cl.⁶ .................. G05G 5/06; A47C 1/02
[52] U.S. Cl. ............. 74/527; 297/344.1; 297/473; 297/341; 296/68.1; 248/429
[58] Field of Search ............... 74/527; 297/232, 297/241, 246, 247, 344.26, 344.1, 473, 341; 296/63, 68, 68.1; 248/429, 430

[56] References Cited

U.S. PATENT DOCUMENTS

| | | | |
|---|---|---|---|
| 3,930,632 | 1/1976 | Shigeta | 248/429 |
| 4,209,159 | 6/1980 | Becker et al. | 297/344.1 |
| 4,621,867 | 11/1986 | Perring et al. | 297/341 |
| 4,629,254 | 12/1986 | Stolper et al. | 297/344.1 |
| 4,730,804 | 3/1988 | Higuchi et al. | 297/344.1 |
| 4,817,904 | 4/1989 | Munakata et al. | 297/344.1 |
| 4,881,774 | 11/1989 | Bradley et al. | 248/430 X |
| 4,909,570 | 3/1990 | Matsuhashi | 248/429 |
| 5,028,028 | 7/1991 | Yamada et al. | 297/344.1 |
| 5,167,393 | 12/1992 | Hayakawa et al. | 297/344.1 |
| 5,228,659 | 7/1993 | Potes et al. | 297/344.1 X |

FOREIGN PATENT DOCUMENTS

| | | |
|---|---|---|
| 0096632 | 12/1983 | European Pat. Off. . |
| 0098702 | 1/1984 | European Pat. Off. . |
| 0349918 | 1/1990 | European Pat. Off. . |
| 0368735 | 5/1990 | European Pat. Off. . |
| 2562004 | 10/1985 | France . |
| 3014300 | 10/1981 | Germany . |
| 3822453 | 1/1990 | Germany . |

*Primary Examiner*—Vinh T. Luong
*Attorney, Agent, or Firm*—Bachman & LaPointe

[57] ABSTRACT

A device for longitudinally adjusting motor vehicle seats, of the type comprising a pair of fixed guides (10) rigid with the vehicle floor and a pair of mobile guides (12) rigid with the seat and slidable along the fixed guides. Between at least one fixed guide and the respective mobile guide there is interposed a spring (44) rigidly fixed to the mobile guide and configured such that under normal operating conditions it engages in toothing (48) on the fixed guide to lock the mobile guide in position. A manually operated lever (54) is provided which acts on the spring (44) to disengage it from the toothing (48) on the fixed guide and release the mobile guide.

15 Claims, 16 Drawing Sheets

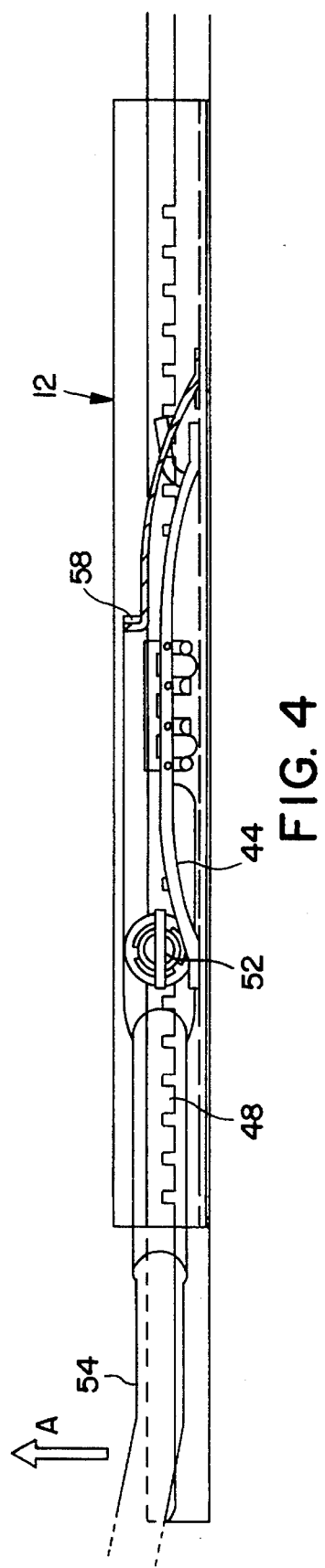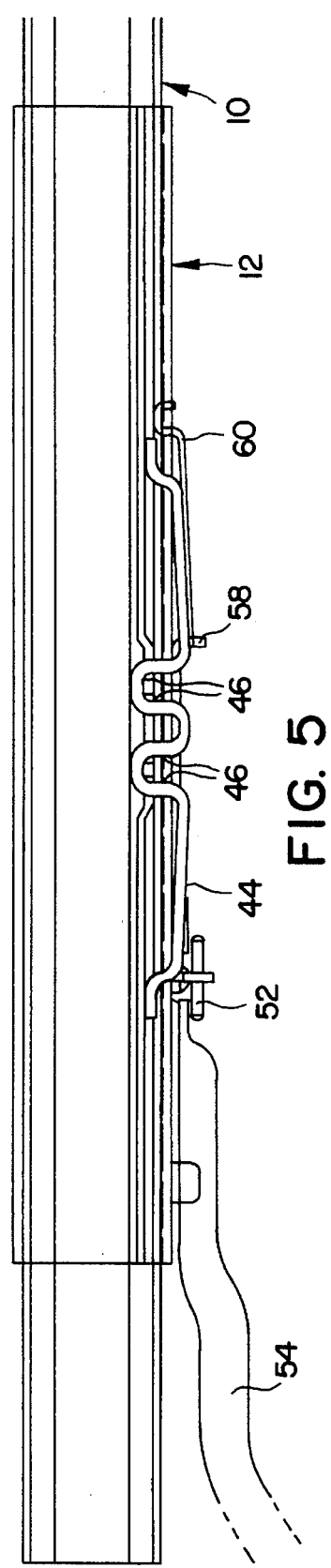

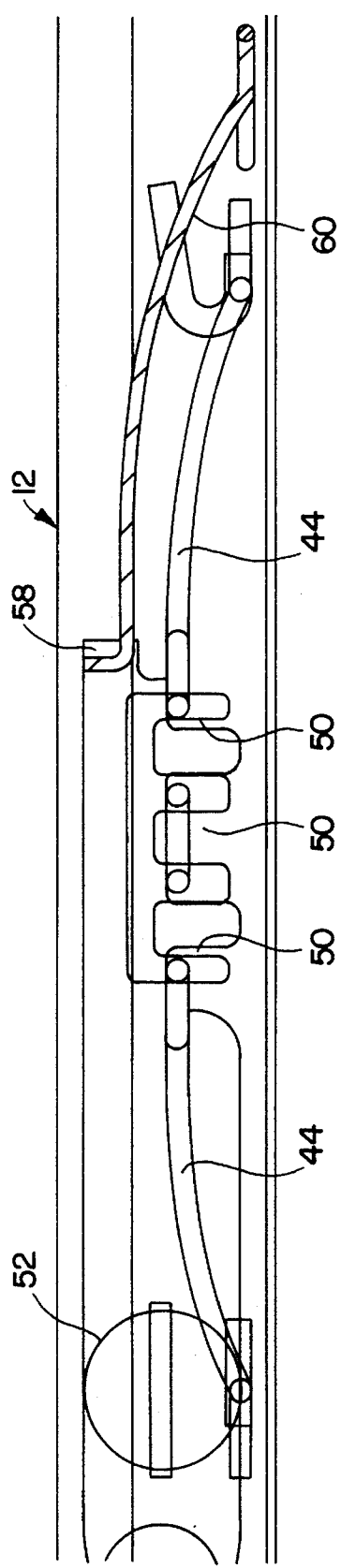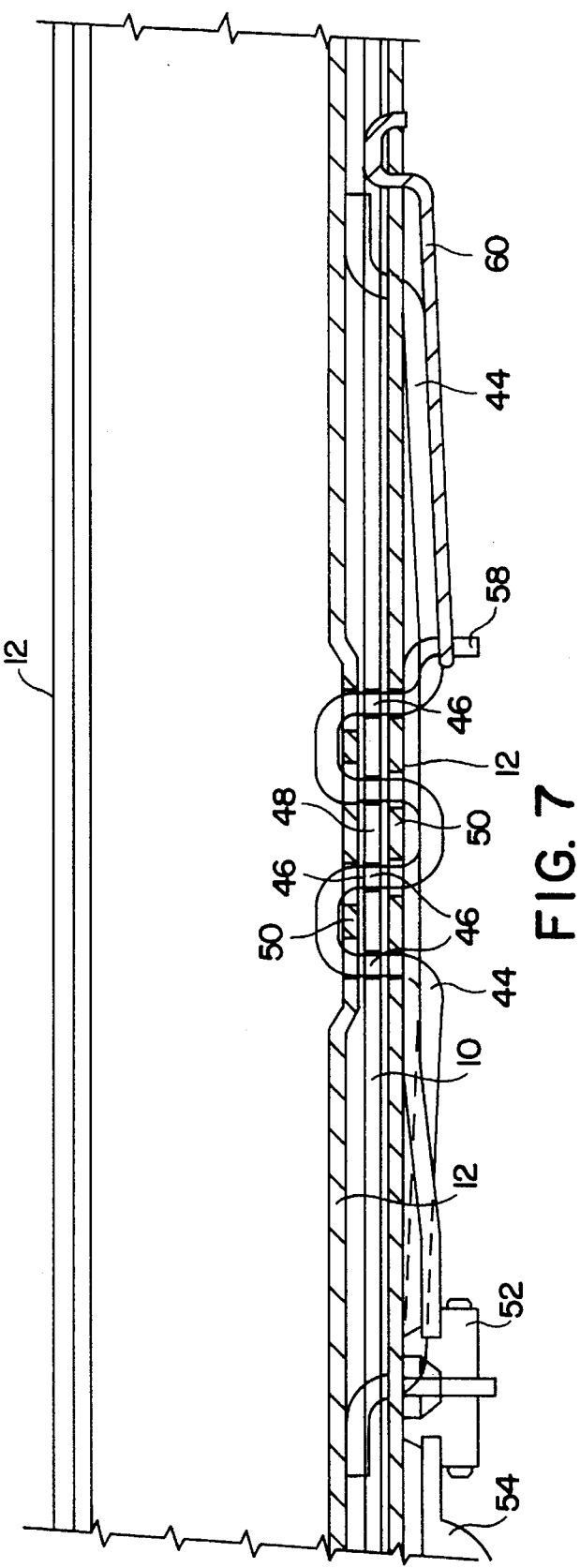

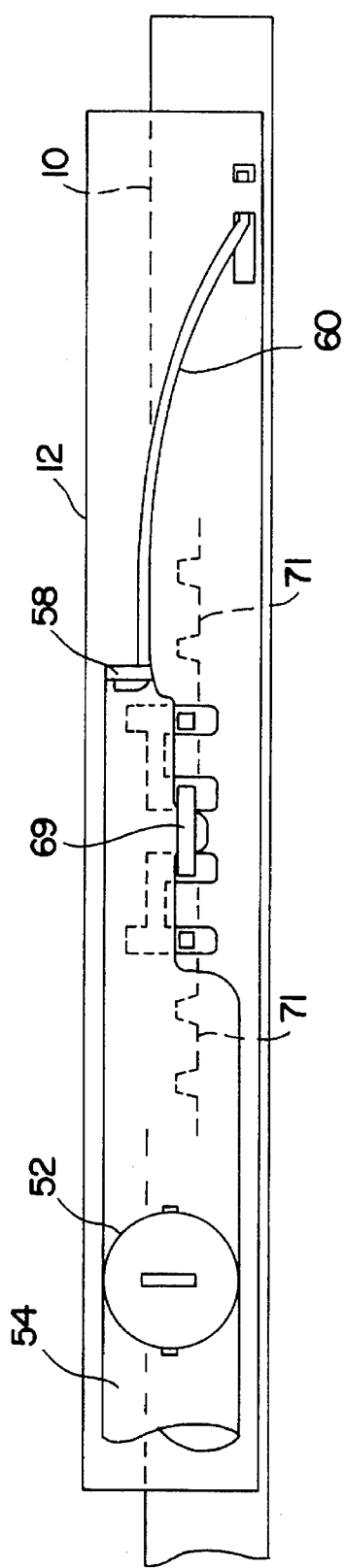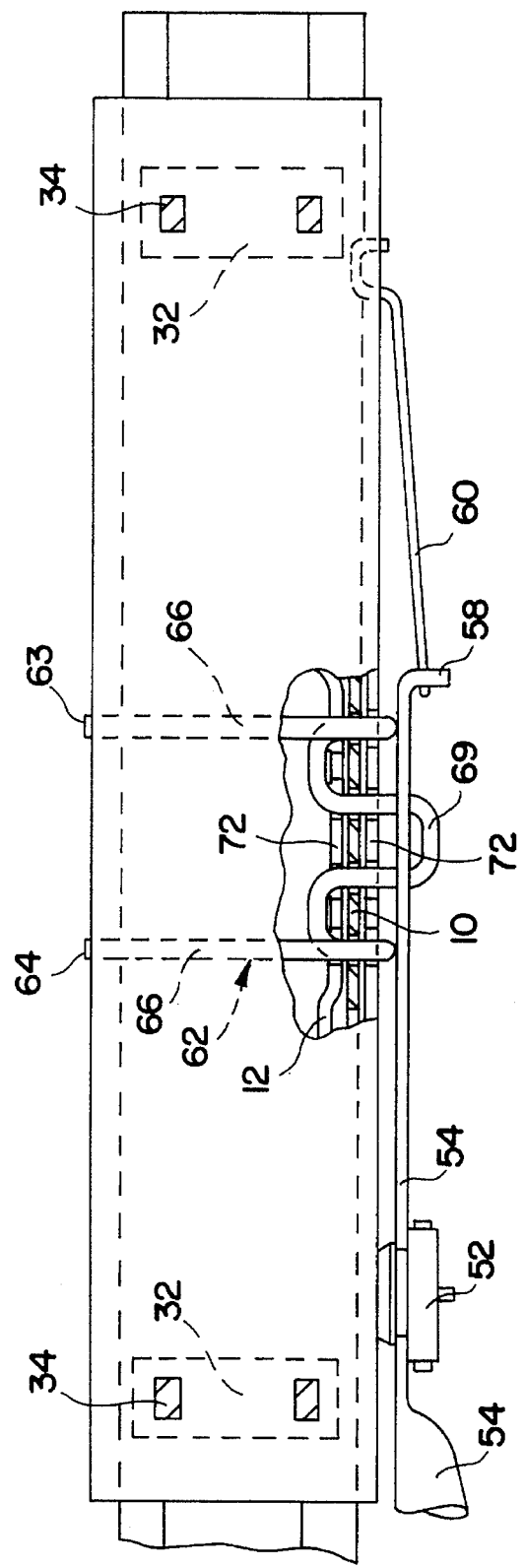

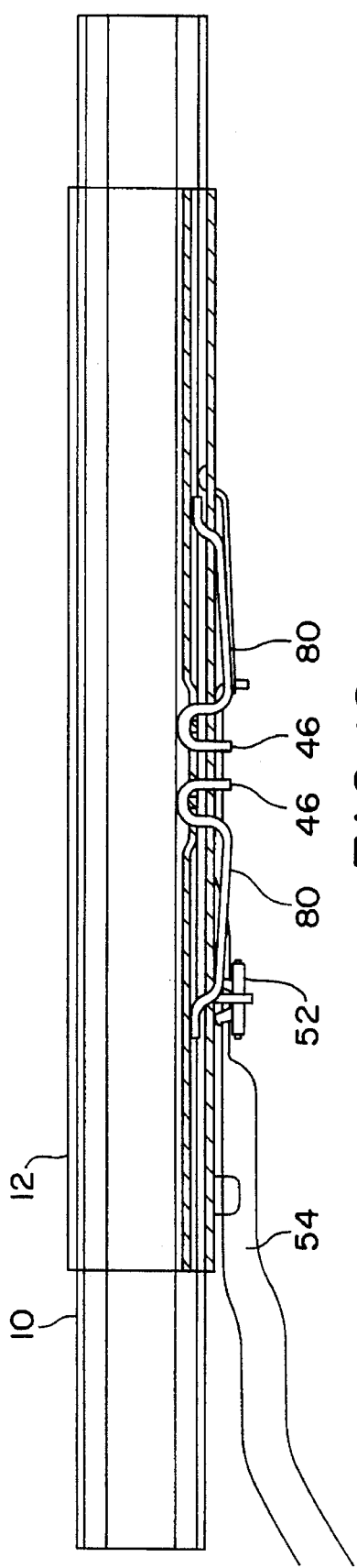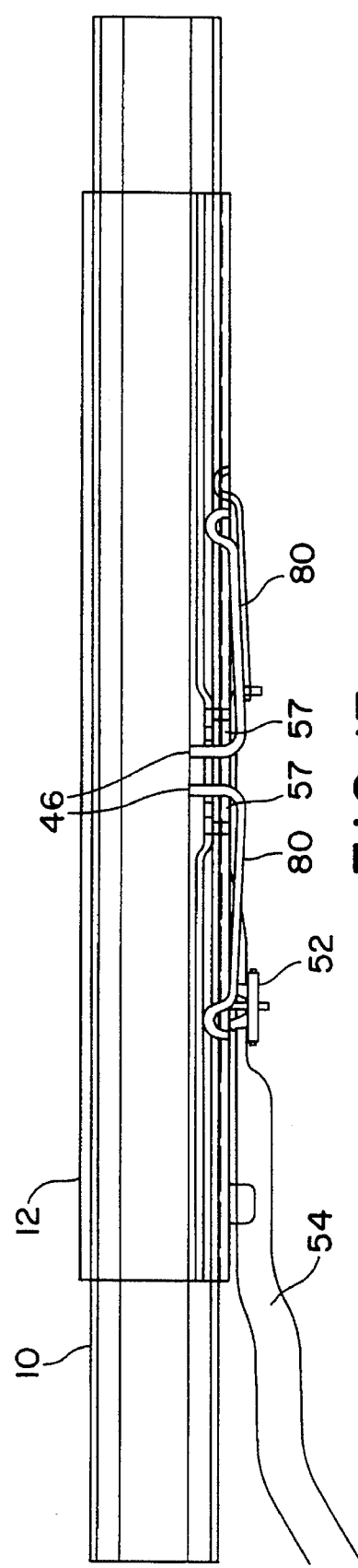

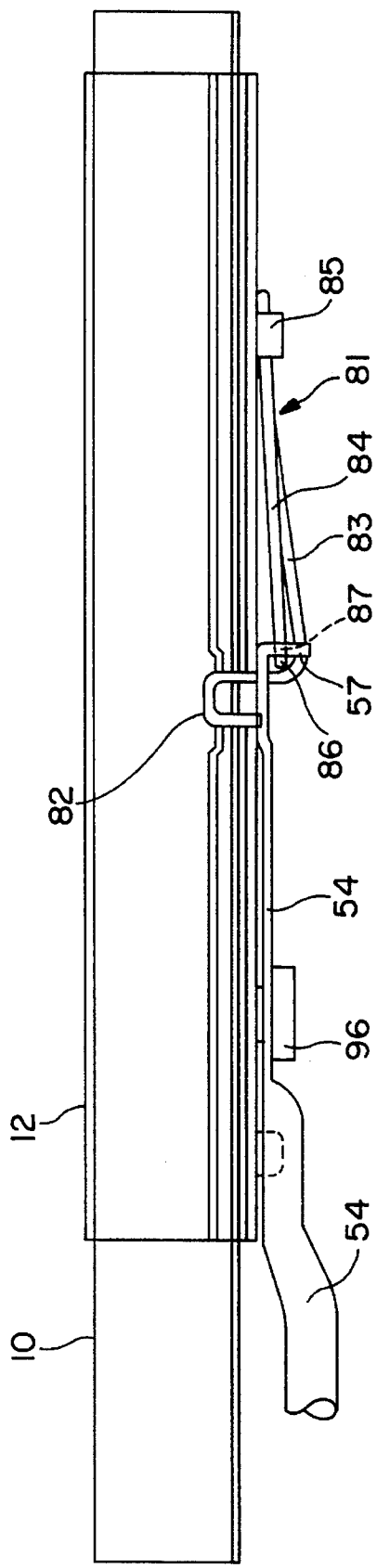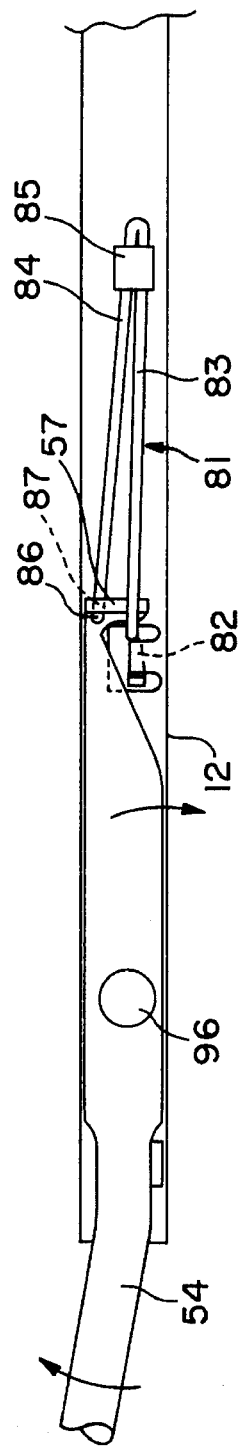

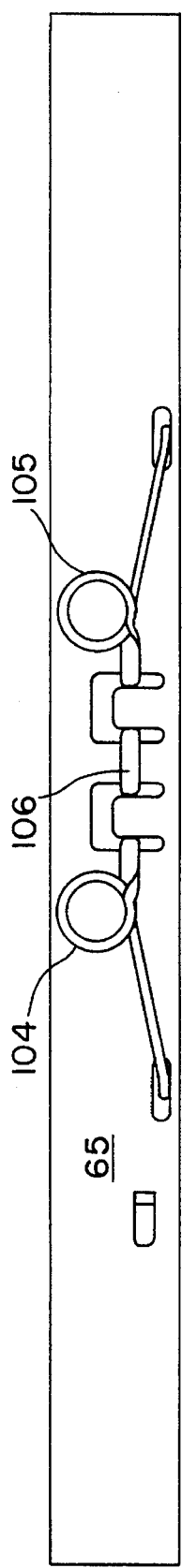
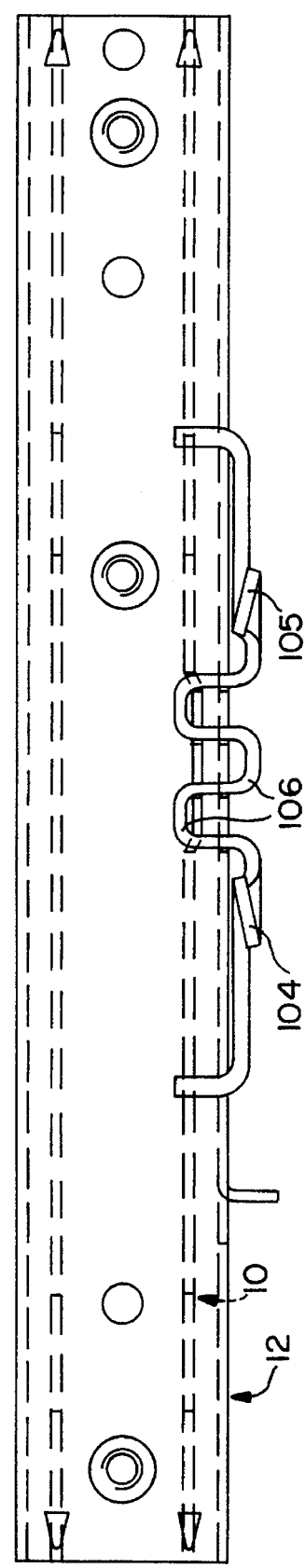

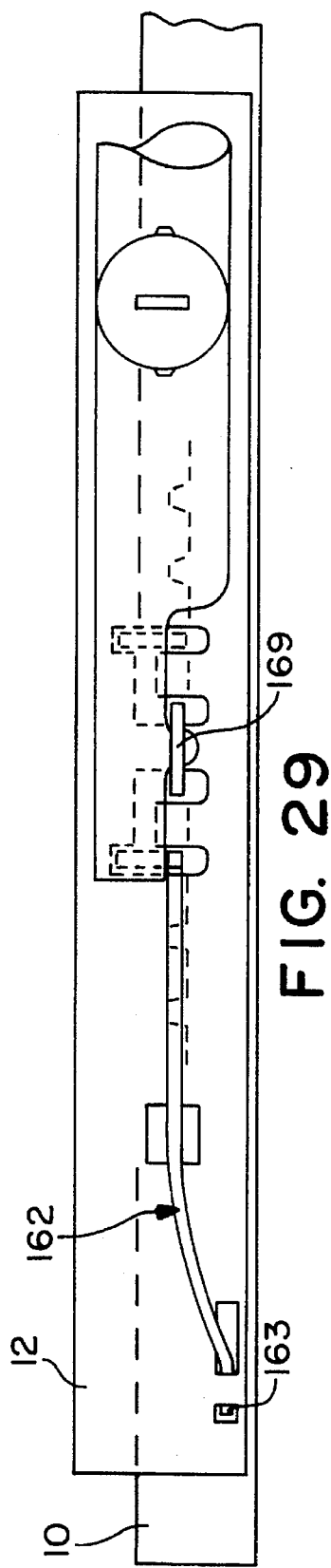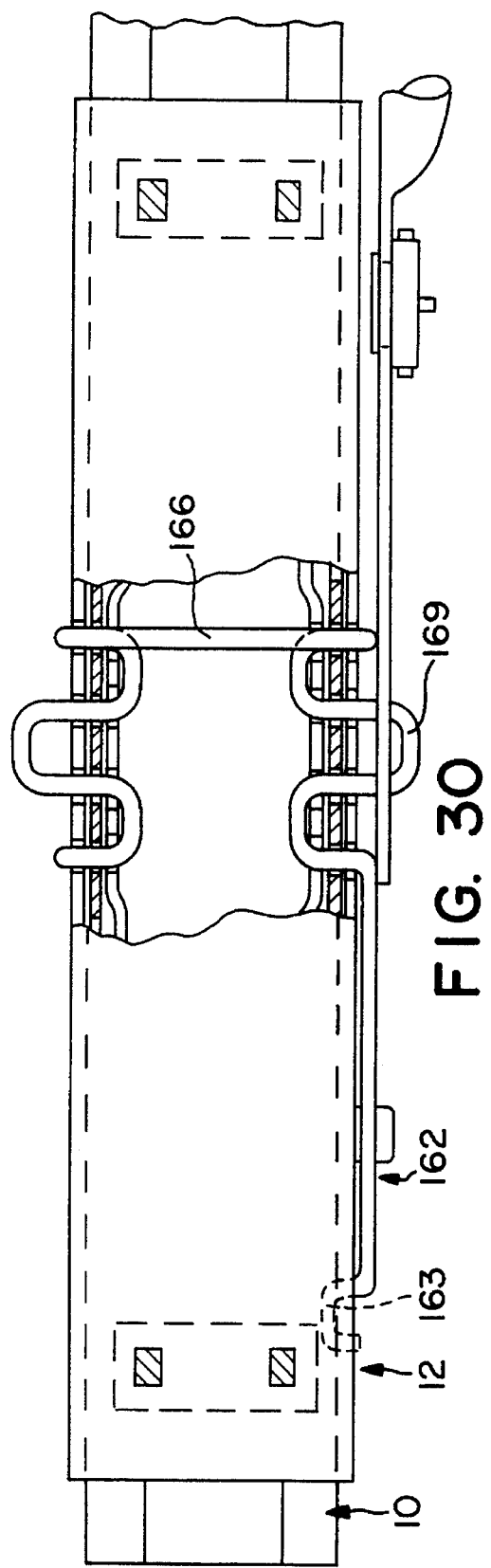

5,524,504

DEVICE FOR LONGITUDINALLY ADJUSTING MOTOR VEHICLE SEATS

This is a continuation of application Ser. No. 07/977,525 filed on Nov. 17, 1992 now abandoned.

BACKGROUND OF THE INVENTION

This invention relates to a device for longitudinally adjusting vehicle seats.

It is known that the front seats of modem vehicles are provided with means for longitudinally adjusting their position. For this purpose a pair of parallel guides is fixed on the vehicle floor to each seat to act as a support and guide for a corresponding pair of mobile guides rigid with the seat.

These adjustment systems also usually comprise slider means such as rollers and sliding blocks interposed between the fixed guides and mobile guides to facilitate movement of the seat, and locking means for locking the fixed guides and mobile guides together when adjustment has been effected.

In some current devices the movement of the mobile guides is halted by the use of a safety mechanism. This mechanism normally consists of a toothed latch fixed to the mobile guide and urged upwards by a spring so that it engages in corresponding toothing on the fixed guide, to lock the seat in position.

The release is achieved manually by operating a tubular handle pivoted on both the right and left mobile guide. To overcome the resistance offered by the spring which urges the latch, the latter is released from the toothing on the fixed guide to enable the seat to move longitudinally.

An object of the present invention is to provide a simplified seat locking device which enables the latch component to be dispensed of, by making the spring multi-functional in the sense that by being suitably sized, shaped and fixed, it is able to lock the guides together.

A further object of the invention is to provide a device of simple and reliable construction and of low cost.

The fixing systems used up to the present time for securely fixing the glides to the seat or to the vehicle floor usually require the guides to have hexagonal nuts or bolts welded to them.

The assembly of the guides therefore has to be preceded by the welding of the nuts. This welding is a drawback in cost terms, and is avoided by using the device according to the invention.

A further object of the invention is to provide a mobile guide, the section of which incorporates a series of threaded collars for seat/guide fixing, as a replacement for the traditional hexagonal nuts.

In order to reduce lateral slack during the longitudinal movement of the seat, the present invention provides a new guide and roller configuration, in which these components have a self-centering profile.

A further object of the invention is to propose a device for longitudinally adjusting motor vehicle seats able to lock the right and left guides independently, and to simultaneously release them.

SUMMARY OF THE INVENTION

These and further objects and advantages, which will be more apparent hereinafter, are attained according to the invention by a device for longitudinally adjusting motor vehicle seats, of the type comprising a pair of fixed guides rigid with the vehicle floor and a pair of mobile guides rigid with the seat and slidable along said fixed guides, characterised in that between at least one fixed guide and the respective mobile guide there is interposed at least one elastically yieldable element rigidly fixed to the mobile guide, said element being configured such that under normal operating conditions it engages in toothing on the fixed guide to lock the mobile guide in position, a manually operated lever being provided with means which act on said elastically yieldable element to disengage it from the toothing on said fixed guide and release the mobile guide.

Some preferred but non-limiting embodiments of the present invention are described hereinafter with reference to the accompanying drawings, in which:

BRIEF DESCRIPTION OF THE DRAWINGS

FIGS. 4 and 5 are respectively a side view and a view from above of the guides comprising the locking system according to the invention;

FIGS. 6 and 7 show to an enlarged scale some details of FIGS. 4 and 5 respectively;

FIGS. 10 and 11 are a longitudinal section and a view from above of the locking system relative to FIGS. 8 and 9;

FIGS. 12 and 13 are respectively two views from above of a second and third embodiment of the locking system of the present invention;

FIGS. 16 and 17 are respectively a plan view and a side view of a fourth embodiment of the locking system;

FIGS. 21 and 22 are respectively an elevational and plan view of a modification to the system of FIGS. 4 and 5;

FIGS. 23 and 24 are respectively an elevational and plan view of a further embodiment of the guide locking system according to the invention.

FIG. 23b is a cross sectional view taken along line 23b—23b of FIG. 23a;

FIGS. 29 and 30 are a side view and a view from above of the system shown in FIGS. 27 and 28.

DETAILED DESCRIPTION OF THE PREFERRED EMBODIMENT

Figure 1:
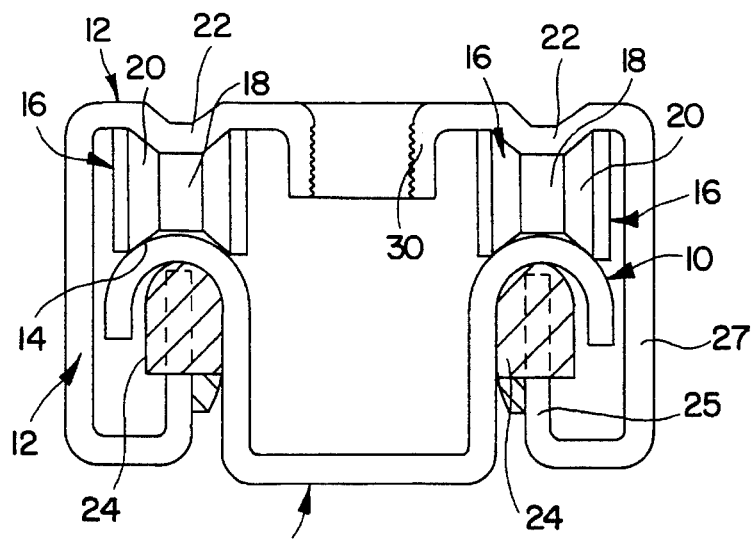
FIG. 1 is a cross-section through a first embodiment of the guides according to the invention.
Figure 1A:
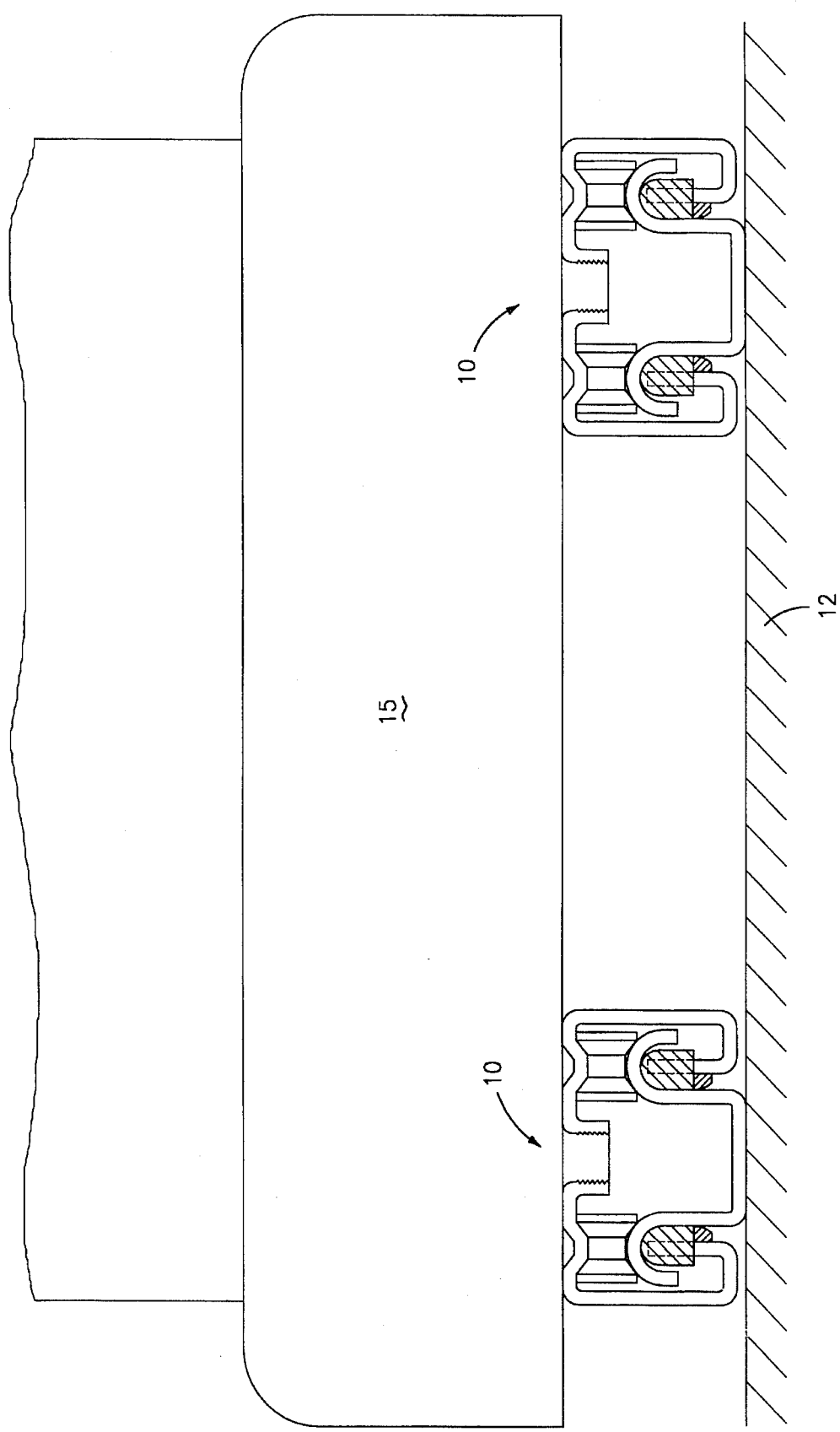
FIG. 1a is a front elevational and partially cross-sectional view showing the guides attached to a vehicle seat and vehicle floor.

With reference to FIG. 1, a fixed guide 10 and a mobile guide 12 are formed from variously shaped metal section bars, preferably formed of steel. As can be seen, the fixed guide 10, to be fixed to the floor 13, as shown in FIG. 1a of the vehicle passenger compartment, has a U-shaped cross-section having bent inwards to form a pair of roundish spines 14. Mobile guide 12 is to be fixed to the bottom of a vehicle seat 15. These act as support and slide surfaces for two sets of self-centering rollers 16 which are interposed between the mobile guide and fixed guide to facilitate the movement of the one relative to the other.

According to the invention, the rollers 16 have a cylindrical central region 18 of narrower diameter and two opposing frusto-conical portions 20, to match the shape of two longitudinal projections 22 defined in the mobile guide 12.

Figure 2:
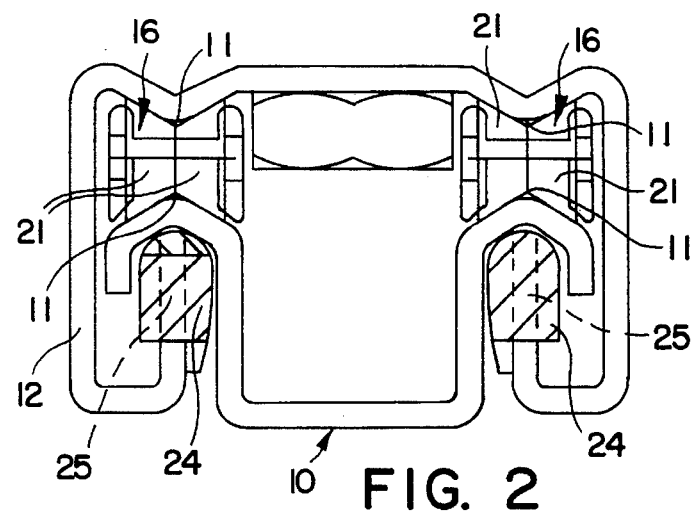
FIG. 2 is a cross-section through a second embodiment of the guides.

FIG. 2 shows a possible modification of the invention in which the fixed guide 10 and mobile guide 12 comprise a pair of spines 11 of suitable opposing V-shape. The rollers 16 assumed the form of two frusto-conical portions 21 joined together by their minor base, creating a particular overall configuration to provide self-centering between the mobile guide and fixed guide, restraining the lateral forces with minimum slack.

The self-centering rollers 16 can be of either metal or plastics construction.

As stated, the rollers facilitate the adjustment of the seat in the longitudinal direction. The vertical slack is taken up by suitable plastics blocks 24 mounted on the vertical edges 25 of the mobile guide 12, and preventing iron-iron contact.

According to the invention, the mobile guide 12 (FIG. 1) is provided with threaded collars 30 arranged centrally along the guide for fixing the guide to the seat. In a different embodiment (not shown for simplicity), the same arrangement can also be used for the fixed guide.

Figure 3:
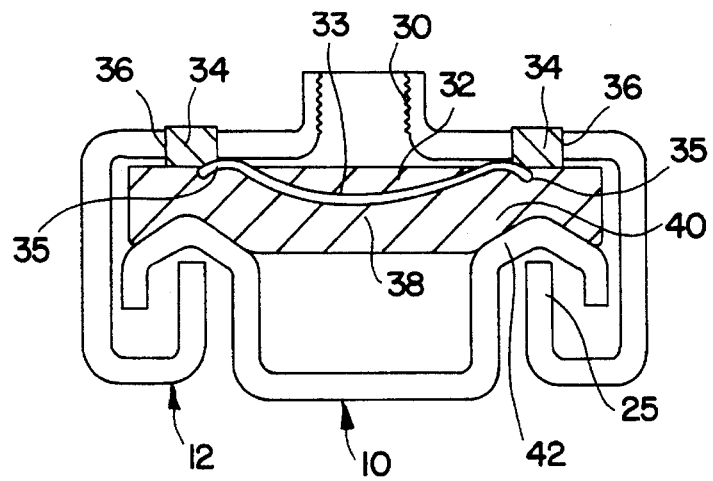
FIG. 3 is a cross-section through a third embodiment of the guides.

With reference to FIG. 3, which shows an embodiment alternative to the embodiments of FIGS. 1 and 2, the sliding motion of the guide is facilitated by a plastics sliding block 32, which can be used instead of the rollers 16.

In this case, the mobile guide 12 no longer comprises the longitudinal projections 20 for rollers. The threaded collar 30 faces upwards, enabling the overall height of the guides to be reduced. The sliding block 32 is fixed to the mobile guide 12 via two protuberances 34 inserted into through holes 36 suitably provided in the mobile guide. The shape of the sliding block 32 determines self-centering relative to the fixed guide 10 by being provided with a slot 38, which accepts the tolerances of the fixed guide and takes up the lateral slack, plus two curved self-centering surfaces 40 which engage the inner edges 42 of the fixed guide 10. An arched elastic element or leaf spring 33 preferably of metal construction is fixed to the upper part of the sliding block 32 and has its ends 35 securely anchored to the body of the sliding block. When preloaded, this leaf spring, which can also be formed integrally with the sliding block, takes up the vertical slack when the seat is not in use.

With reference to FIGS. 4, 5, 6 and 7, the guide locking system consists essentially of a latch spring 44, the ends of which are fixed to the mobile guide 12. The spring 44 is in the form of a leaf spring, with its central part (FIG. 5) comprising a series of turns or elbows of a shape and cross-section chosen on the basis of the resistance of the same to tractive forces as required by international regulations. The configuration of the turns can be round or square, the transverse portions 46 of the spring 44 being inserted between the teeth 48 of the fixed guide 10 and the teeth 50 of the mobile guide 12, to lock the guides into position.

On the mobile guides there is usually pivoted a release lever 54 which when raised in the direction of the arrow A compresses the spring 44 downwards to disengage it from the teeth of the fixed guide 10.

The release lever 54 is provided at its two ends with horizontal lugs 58 urged upwards by respective return springs 60 fixed at one end to the right and left mobile guides. The purpose of the springs 60 is to return the lever 54 to its rest position when the adjustment has been made and the guides locked.

A further particularly advantageous embodiment of the guides and locking system according to the invention is shown in FIGS. 8 to 11.

In this embodiment, the spring latch 62 has its ends 63 and 64 embedded in the vertical wall 65 of the mobile guide 12. The spring 62 passes transversely through the mobile guide by way of two transverse portions 66, emerges from the mobile guide through slots 67 and then proceeds downwards by way of two vertical portions 68, which are joined together by an elbow portion 69. This portion is inserted between the teeth 71 of the fixed guide 10 and the teeth 72 of the mobile guide 12, in a manner analogous to that already described.

Figure 9:
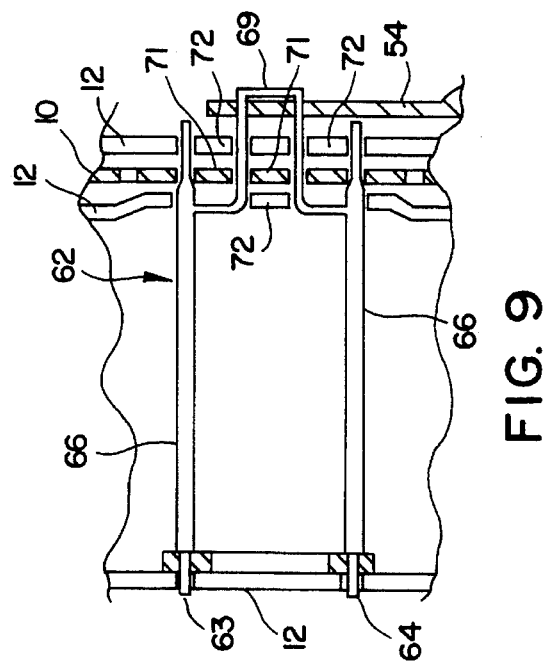

In FIG. 9 it can be seen that the central elbow 69 of the spring can be urged downwards by the lever 54 to disengage the teeth 71 of the fixed guide. When the lever is in its lowered release position (shown by dashed lines) the user can slide his seat forwards or rearwards. On releasing the lever 54, the spring 62 returns automatically upwards into the locking position.

Plastics sliding blocks (FIG. 11) can be used as the sliding means with the system using the spring latch shown in FIGS. 8–11, with having the further advantage of reduced vertical guide dimensions.

A variant to the embodiment of FIGS. from 8 to 11 is shown in FIGS. from 27 to 30.

In this further embodiment, both sides of the spring latch 162 are provided with elbow portions 169 designed to insert between the teeth 171 of the fixed guide 10 and the teeth 172 of the mobile guide 12 on either sides of the guides so as to guarantee further locking actions. Two vertical portions 168 connect the elbow portions 169 to a single transverse portion 166. As shown in FIGS. 29 and 30, the end 163 of the spring latch 162 is fixed to the mobile guide 12.

With reference to FIGS. 12 and 13, the spring latch can alternatively be split into two equal parts 80 (FIG. 12). In contrast, in the example shown in FIG. 13 there is one right and one left spring for each guide.

Compared with known locking devices, in the configuration of FIG. 12, there is the advantage that each of the springs 80 engages in two sections both the fixed guide and the mobile guide. In the configuration of FIG. 13, there is the advantage of a smaller spring meshing space than with known devices because although there are still four fixing-counteracting points, these are achieved on two transverse axes instead of on a single longitudinal axis.

Figure 14:
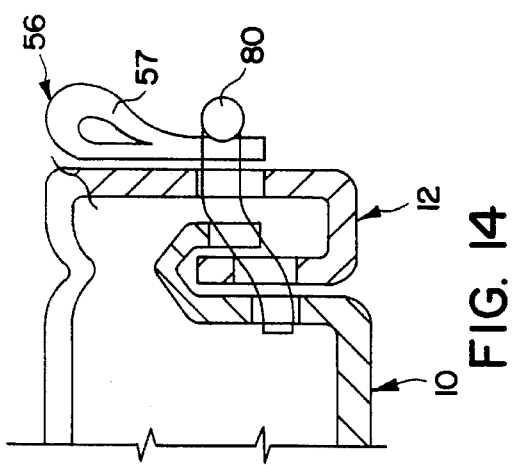
FIGS. 14 and 15 are two cross-sections through the embodiment of FIG. 13 in two different operating configurations.
Figure 15:
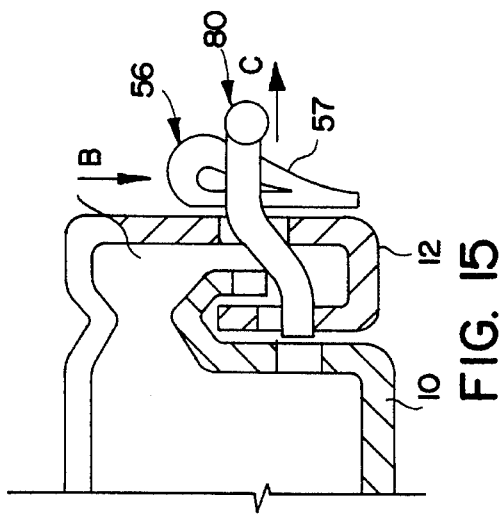
Figure 8:
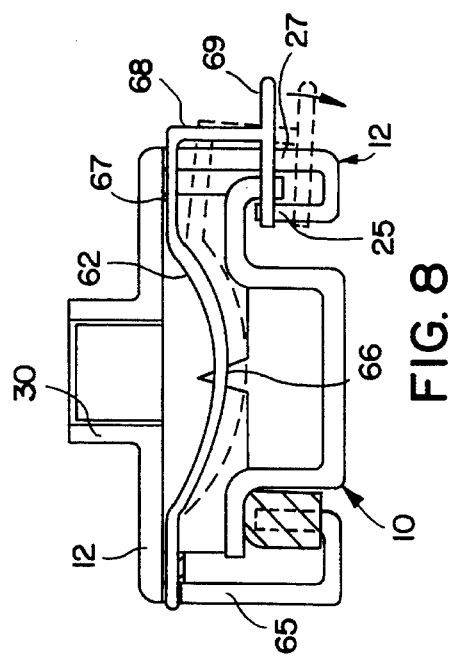
FIGS. 8 and 9 are respectively a cross-section and a plan view of a first modification of the guide locking system.

The springs 80 are normally inserted preloaded into the locking position (as can be seen in FIG. 14, which represents a section through FIG. 13). Withdrawal is achieved by the release lever which, on being rotated in known manner, inserts a cam-shaped or inclined-plane part 57 of the comb 56 between the mobile guide and the spring. During the lowering stage (FIG. 15, arrow B) the part 57 withdraws the spring 80 outwards (FIG. 15, arrow C) to release it from the fixed guide.

A further alternative embodiment of the present invention is shown in FIGS. 16 and 17. In this case a single spring latch is shaped and fixed to the mobile guide in such a manner as to present double-direction preloading, namely horizontal for locking the guides and vertical for returning the release lever to its rest position when the adjustment has been effected. The spring latch, indicated by 81, is bent to form a substantially horizontal locking elbow 82, inserted with horizontal preload into the locking position, and two consecutive portions 83 and 84 lying in a substantially vertical plane. The spring 81 is fixed to the mobile guide 12 by a bridge 85 formed in this latter. The end 86 of the portion 84 is inserted under vertical preload into a through hole 87 provided in the inclined-plane part 57 of the release lever 54, for automatic return of the lever. As with the configuration shown in FIGS. 13, 14 and 15, on moving downwards, the inclined-plane part 57 withdraws the portion 83 outwards, to disengage the elbow 82 from the fixed guide 10.

Figure 18:
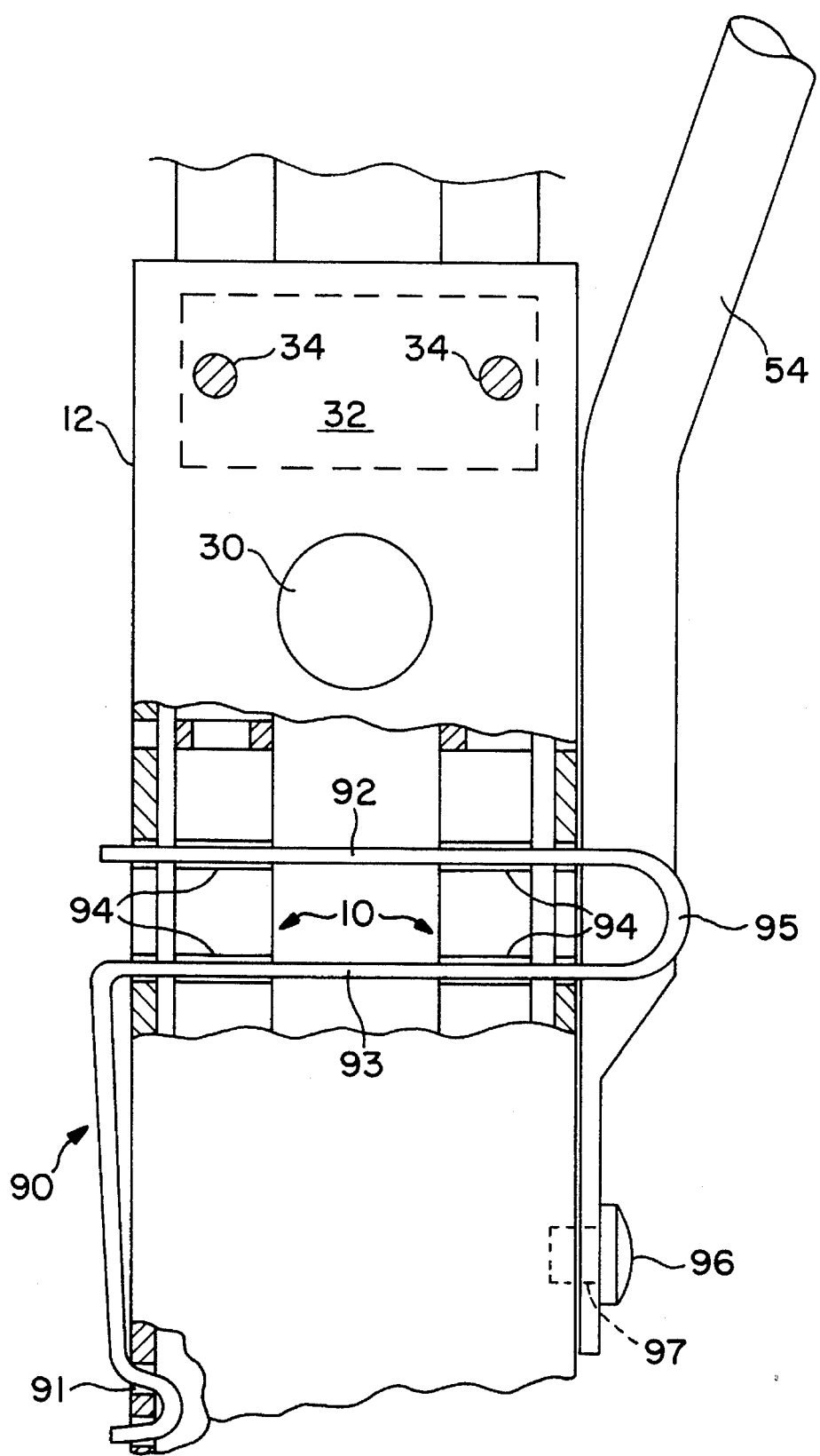
FIG. 18 is a plan view of a fifth embodiment different from the preceding.

A further embodiment of the present invention is shown in FIG. 18. The spring 90 is fixed in a slot 91 in the mobile guide 12, with its transverse portions 92 and 93 retained in the compartments 94 of the fixed guide 10. The spring is normally inserted downwards into the locking position under a preload. Withdrawal is achieved by moving the lever 54 upwards and raising the elbow 95 and with it the portions 92 and 93, which emerge from the compartments 94, to be released from the fixed guide. This is made possible by providing the lever with a rear fulcrum 96. This is a spacing fulcrum entirely of plastics construction, fixed by snapping directly into a hole 97 provided in the mobile guide 12. This simplified configuration (FIG. 18) of the spring, which by acting downwards becomes inserted in the compartments 94 of the fixed guide on both sections, enables the counteraction to be compensated within a small space (only one pitch) having a good mechanical "insertion/counteraction" cross-section.

Figure 19:
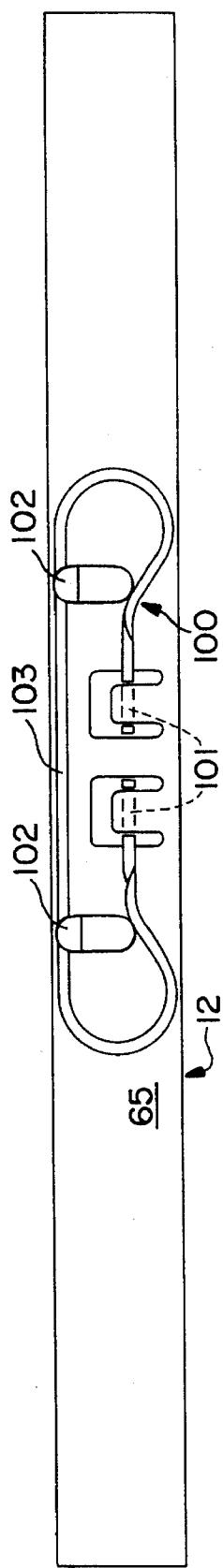
FIGS. 19 and 20 are respectively an elevational and plan view of a sixth embodiment of the locking system.
Figure 20:
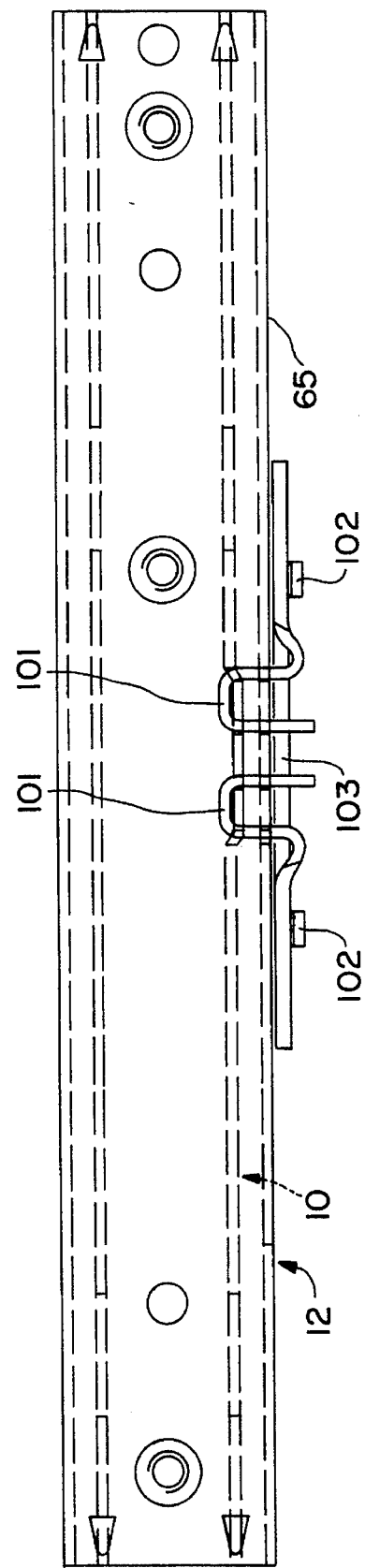

With reference to FIGS. 19 and 20, in a sixth embodiment of the spring latch 100, latch 100 has its ends bent and is fixed against the side wall 65 of the mobile guide 12 by hooks 102 formed in the wall 65 for locking the central longitudinal part 103 of the spring, the ends of the spring forming the insertion elbows 101. An embodiment of the spring representing a modification of that shown in FIGS. 4–7 is shown in FIGS. 21 and 22. In this embodiment the springing effect is improved by two loops formed in proximity to the elbow portions 106.

Figure 23A:
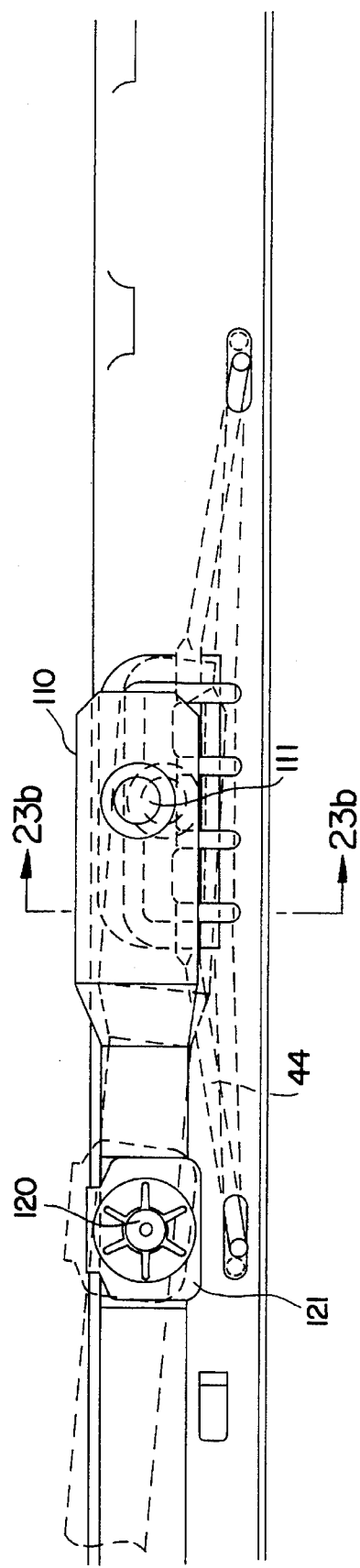
FIG. 23a is an enlarged side elevational view of a the functional positions of the guide locking system shown in FIGS. 23 and 24.
Figure 23B:
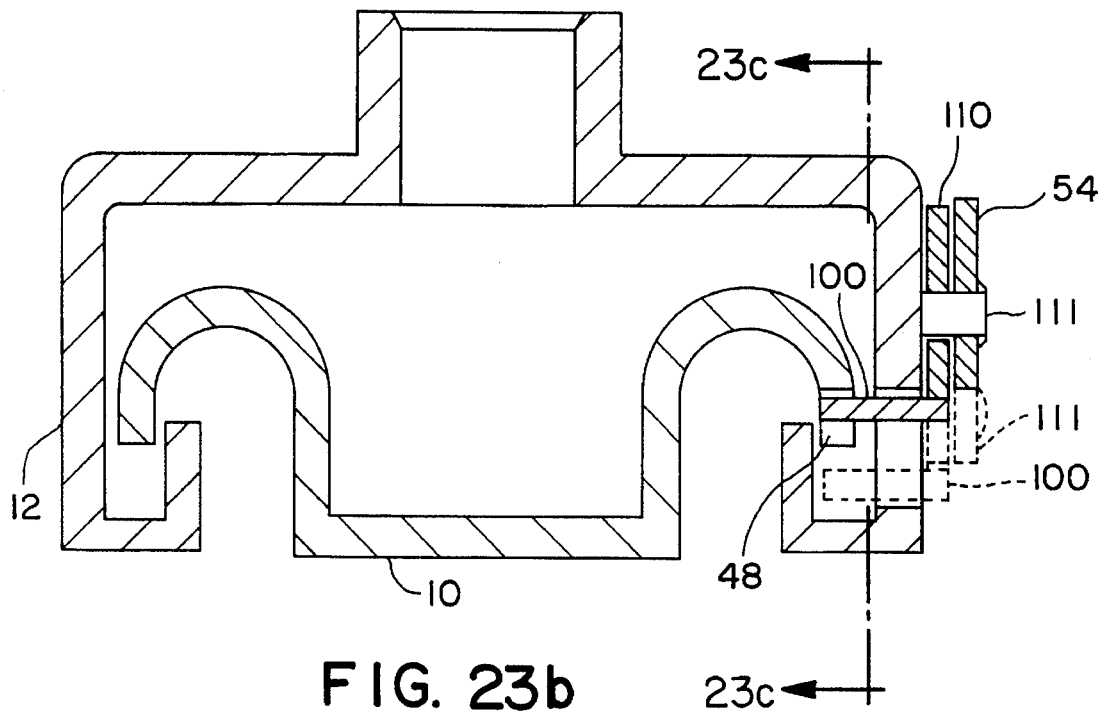
Figure 23C:
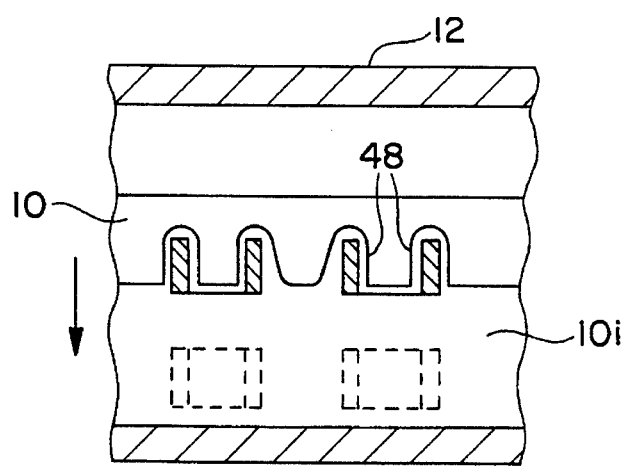
FIG. 23c is a cross sectional view taken along line 23c—23c of FIG. 23b.
Figure 24:
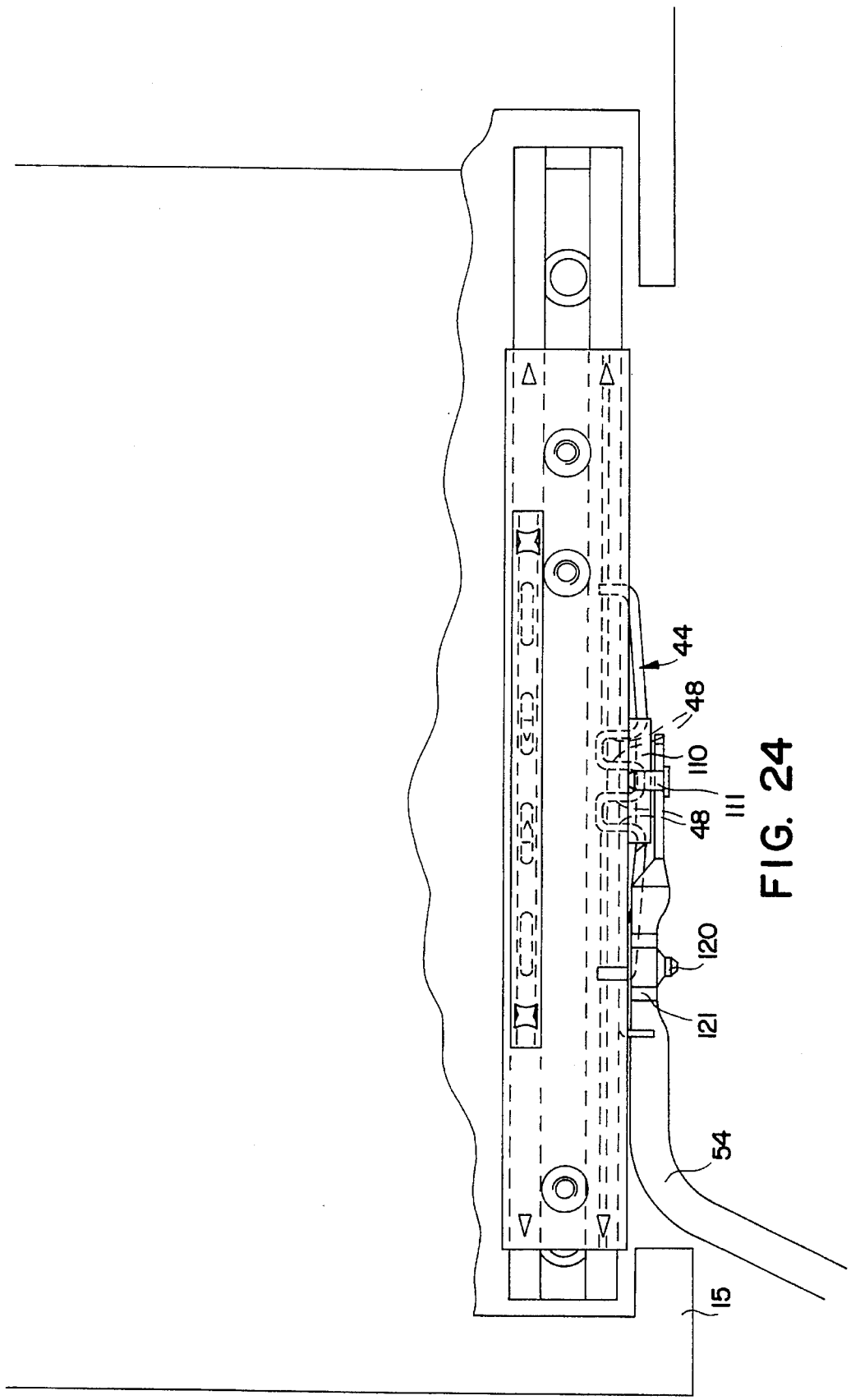
Figure 27:
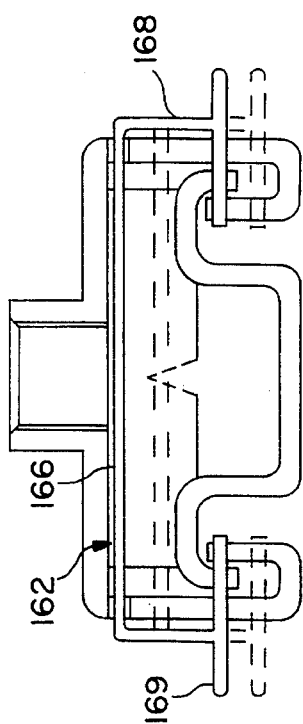
FIGS. 27 and 28 are a longitudinal section and a view from above of a modification of the locking system relative to FIGS. 8 and 9.
Figure 28:
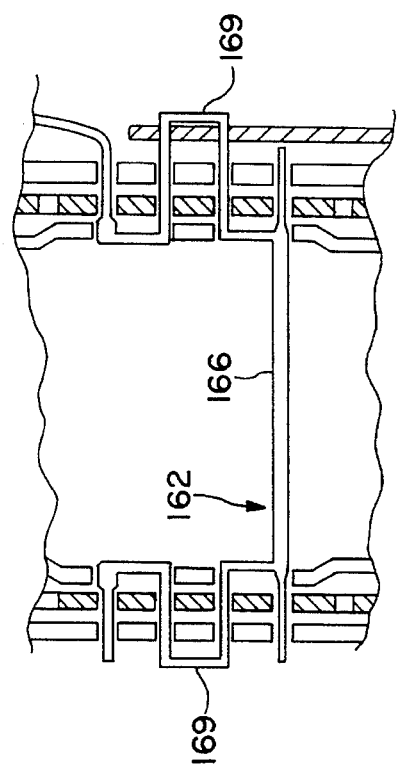

With reference to FIGS. 23 and 24, to achieve uniform lowering of the elbow portion 106 of the spring when this is compressed by the release lever 54, a block 110 is interposed between the spring 100 and lever 54 and with a certain clearance is pivoted on a pin 111 welded to the end of the lever 54 on the centre line of the spring. The block 110 can advantageously be snap-mounted on the spring 100. On raising the release lever as shown in FIG. 23a, the block 110 undergoes rotary translation against the spring, remaining parallel to the spring and causing an equal lowering of the transverse parts 48 of the spring, with the result that all parts of the spring simultaneously disengage the toothing on the fixed guide as shown in FIGS. 23b and 23c.

Figure 25:
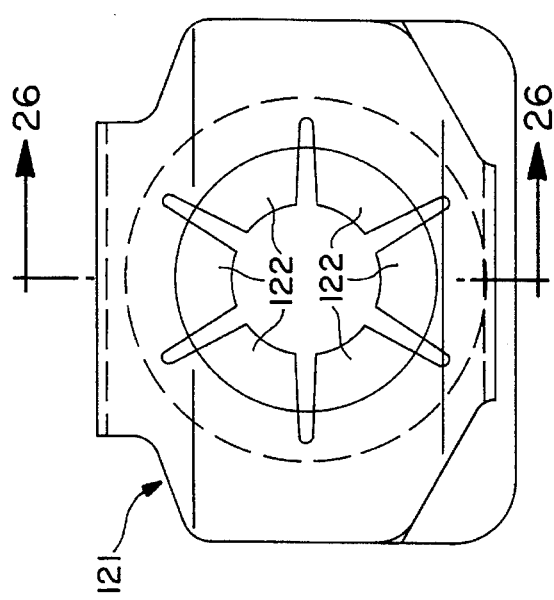
FIGS. 25 and 26 are respectively a front view and a cross-section of a detail of FIGS. 23 and 24 to an enlarged scale.
Figure 26:
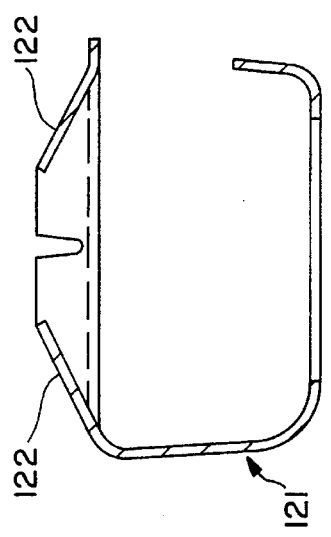

To enable the release lever 54 to be fixed to the mobile guide 12 in any position to satisfy the requirements of any particular application, on the mobile guide in the embodiment shown in FIGS. 23 and 24, there is welded a pin 120 able to form a quick connection with a spring clip 121 (shown separately in FIGS. 25 and 26), which is welded or snap-mounted on the release lever 54. The spring clip 121 comprises elastic fins 122 which converge towards the centre of the seat to firstly facilitate the mounting of the spring clip onto the pin, and then to close onto the pin and prevent its withdrawal.

The present invention therefore provides an extremely simple locking system comprising a small number of components which are of rapid construction and assembly and of low cost.

What is claimed is:

1. A device for longitudinally adjusting a motor vehicle seat attached to a vehicle floor via a pair of fixed guides rigidly fixed with the vehicle floor and a pair of mobile guides rigidly fixed with the seat and slidable along said fixed guides, at least one of said fixed guides and a respective mobile guide having interposed therebetween at least one elastically yieldable means, said yieldable means being rigidly fixed to the mobile guide, said fixed guides including toothing and said yieldable means being configured to engage said toothing to lock the mobile guide in position, said device further including a manually operated lever having means for acting on said elastically yieldable means to engage said elastically yieldable means with said toothing and lock said mobile guide into said position and to disengage said elastically yieldable means from the toothing and release the mobile guide.

2. A device as claimed in claim 1, wherein said elastically yieldable means is provided with at least one traverse rigid element arranged to engage in the toothing on the fixed guide.

3. A device as claimed in claim 2, wherein said means for acting comprises at least one comb element which engages said transverse rigid elements of said elastically yieldable means.

4. A device as claimed in claim 2, wherein said elastically yieldable means comprises a spring with bent ends which is fixed to a lateral wall of the mobile guide by hooks which are rigid with the wall and retain the central longitudinal portion of the spring, said transverse rigid elements being situated at the ends of the spring.

5. A device as claimed in claim 1, wherein said elastically yieldable means is a pair of springs each having one end fixed to the mobile guide.

6. A device as claimed in claim 1, comprising right and left mobile guides, each of said left and right mobile guides being independently lockable and releasable via each of said left and right mobile guides having said elastically yieldable means, wherein locking of said mobile guides corresponds to the decompression of said elastically yieldable means by the lever, and release of said mobile guides corresponds to the compression of the elastically yieldable means by the lever.

7. A device as claimed in claim 1, wherein the mobile guides are provided with threaded collars for being affixed to at least one of the vehicle seat and floor.

8. A device as claimed in claim 1, further including rollers having self centering means and said mobile guide being provided with longitudinal projections, said rollers interposed between the mobile guide and the fixed guide, said self centering means for centering said rollers on said longitudinal projections.

9. A device as claimed in claim 1, further comprising sliding blocks interposed between the mobile guides and the fixed guides, said sliding blocks being provided with protuberances to be inserted in suitable holes provided in the mobile guides for fixing the sliding blocks thereto, the sliding blocks being further provided with a slot for take-up of lateral slack in the guides, and with curved self-centering surfaces for resting on the fixed guides.

10. A device as claimed in claim 9, wherein said sliding block includes an elastic element for take-up of vertical slack when the seat is not in use.

11. A device as claimed in claim 1, wherein said elastically yieldable means has at least one end fixed into one side of the mobile guide and passes transversely through the mobile guide by way of at least one transverse rigid portion connected to at least one elbow portion, said elbow portion engaging the toothing of the fixed guide on at least one side and projecting transversely from the guides in such a manner as to form an engagement means for said manually operated lever.

12. A device as claimed in claim 1, wherein said means for acting comprises a part which during lowering transversely withdraws the elastically yieldable means from engagement in the fixed guide.

13. A device for longitudinally adjusting a motor vehicle seat attached to a vehicle floor via a pair of fixed guides rigidly fixed with the vehicle floor and a pair of mobile guides rigidly fixed with the seat and slidable along said fixed guides, at least one of said fixed guides and a respective mobile guide having interposed therebetween at least one elastically yieldable means, said yieldable means being rigidly fixed to the mobile guide, said fixed guides including toothing and said yieldable means being configured to engage said toothing to lock the mobile guide in position, said device further including a manually operated lever having means for acting on said elastically yieldable means to engage said elastically yieldable means with said toothing and lock said mobile guide into said position and to disengage said elastically yieldable means from the toothing and release the mobile guide, wherein said lever has a pin welded to its end in alignment with the center line of said elastic yieldable means, and between said elastically yieldable means and the release lever there is interposed a block which is pivoted with a clearance on said pin.

14. A device for longitudinally adjusting a motor vehicle seat attached to a vehicle floor via a pair of fixed guides rigidly fixed with the vehicle floor and a pair of mobile guides rigidly fixed with the seat and slidable along said fixed guides, at least one of said fixed guides and a respective mobile guide having interposed therebetween at least one elastically yieldable means, said elastically yieldable means being rigidly fixed to the mobile guide, said fixed guides including toothing and said elastically yieldable means being configured to engage said toothing to lock the mobile guide in position, said device further including a manually operated lever having means for acting on said elastically yieldable means to engage said elastically yieldable means with said toothing and lock said mobile guide into said position and to disengage said elastically yieldable means from the toothing and release the mobile guide, wherein the mobile guide has a pin welded thereon for engaging said release lever, said release lever having a spring clip attached to the release lever, said pin able to form a quick connection with said spring clip, the spring clip comprising elastic fins which converge onto the pin to prevent withdrawal of said lever from said pin.

15. A device for longitudinally adjusting a motor vehicle seat attached to a vehicle floor via a pair of fixed guides rigidly fixed with the vehicle floor and a pair of mobile guides rigidly fixed with the seat and slidable along said fixed guides, at least one of said fixed guides and a respective mobile guide having interposed therebetween at least one leaf spring, said leaf spring being rigidly fixed to the mobile guide, said fixed guides including toothing and said leaf spring being configured to engage said toothing to lock the mobile guide in position, said device further including a manually operated lever having means for acting on said leaf spring to engage said leaf spring with said toothing and lock said mobile guide into said position and to disengage said leaf spring from the toothing and release the mobile guide.

* * * * *